June 16, 1959 — V. G. VAUGHAN — 2,891,124
THERMOSTATIC ELECTRIC CIRCUIT-BREAKERS
Filed Oct. 4, 1957 — 2 Sheets-Sheet 1

INVENTOR.
VICTOR G. VAUGHAN
BY
ATTORNEY

INVENTOR.
VICTOR G. VAUGHAN
BY John W. Michael
ATTORNEY

2,891,124

THERMOSTATIC ELECTRIC CIRCUIT-BREAKERS

Victor G. Vaughan, Attleboro, Mass.

Application October 4, 1957, Serial No. 688,292

2 Claims. (Cl. 200—122)

This invention relates to improvements in thermostatic electric circuit-breakers and particularly to motor protectors.

Inherently, snap-acting overheat motor protectors have heretofore included the heater, thermostatic element and switch as a single complete assembly mounted in a one-piece base or housing. Because of the multiplicity of motors of different designs, ratings, temperature characteristics, and usages requiring a protector of different characteristics it has not been economically possible for the protector manufacturers, the motor manufacturers and jobbers of repair parts to carry stocks of such complete protectors for only the limited number of motors produced in large volume. Motors produced in relatively small number have, therefore, rarely been equipped with motor protectors.

An object of this invention, therefore, is to provide a thermostatic circuit-breaker or motor protector of such design that a wide variety of protectors can be quickly made from a relatively small stock of subassemblies. This makes it economical for protector manufacturers, motor manufacturers and jobbers to carry stocks from which immediate shipment may be made. This also permits protectors to be added to motors produced in more limited volume or to repaired motors not previously protected.

Another object of this invention is to provide such a protector in which the heater operates efficiently at properly designed and desired temperatures.

These objects are obtained by employing a heater assembly and a thermostatic switch assembly which interfit to form a complete circuit-breaker or motor protector having dimensional characteristics conforming with those now standard in the industry. The heater assembly is complete with an insulating base, heating element, and terminals. The thermostatic switch assembly is complete with an insulating base, fixed contacts, contact terminals, and thermal element with moving contacts. There may be an adjustment for the thermal element carried by such base and operable from outside of the completed protector. The bases of the two assemblies interfit to form a complete housing having the outside dimensions of those of industry standard. One base may form the housing and the other fit therein or both bases may interfit so that each forms a part of the housing. In both constructions the terminals project in the same direction from the protector; the bases having grooves and aligned openings to accommodate this arrangement of the terminals. Any means may be used for locking the bases together. For example, the terminals of one assembly may be staked or dimpled after union with the other assembly. The terminals of one part may have biased projections which snap into complementary depressions in the other part upon union of the bases.

For illustration of the economic saving possible, a stock may consist of ten thermostatic assemblies, each of different rating, and 26 heater assemblies, each of different rating. From this stock a protector can be made with a rating selected from 260 different ratings. To meet a similar 260 different ratings when stocking the old style unitary protectors requires 260 complete thermostatic switch assemblies including heaters. In other words, to furnish one old style protector for any requirement within 260 different ratings needs an investment equal to the cost of 260 complete thermostatic switch assemblies including heaters, as compared to the cost of ten thermostatic assemblies and 26 heater assemblies to furnish one new style protector for any requirement within 260 different ratings.

One embodiment of this invention is illustrated in the accompanying drawings in which.

Figure 1:
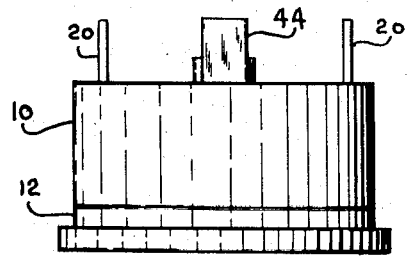
Fig. 1 is a view in side elevation of a thermostatic electric circuit-breaker designed for motor protector use and embodying the present invention.
Figure 2:
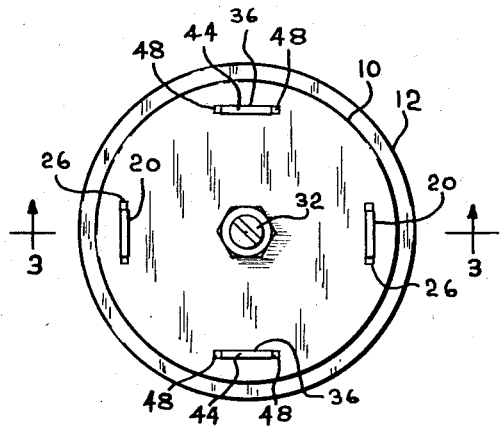
Fig. 2 is a top plan view of the protector of Fig. 1.
Figure 3:
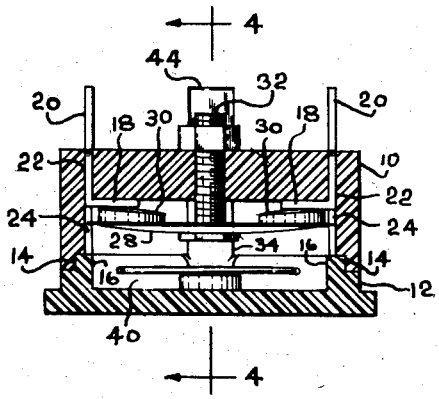
Fig. 3 is a sectional view taken along the line 3—3 of Fig. 2.
Figure 4:
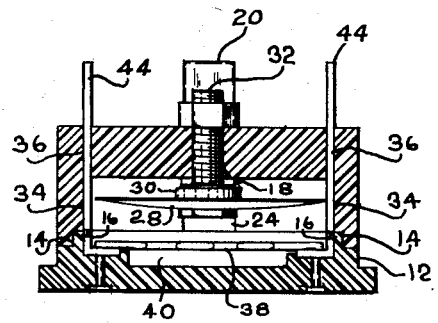
Fig. 4 is a sectional view taken on the line 4—4 of Fig. 3.
Figure 5:
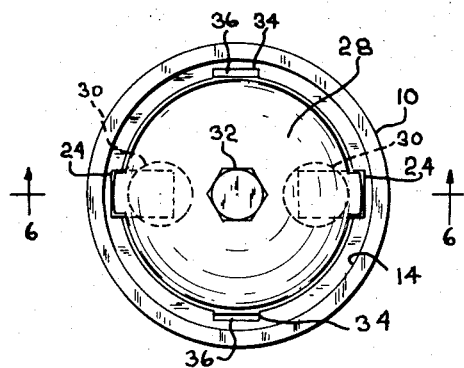
Fig. 5 is a bottom plan view of the top section of the protector of Fig. 1 including the thermostatic switch assembly.
Figure 6:
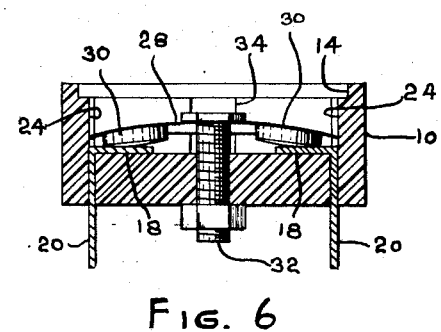
Fig. 6 is a sectional view taken on the line 6—6 of Fig. 5.
Figure 7:
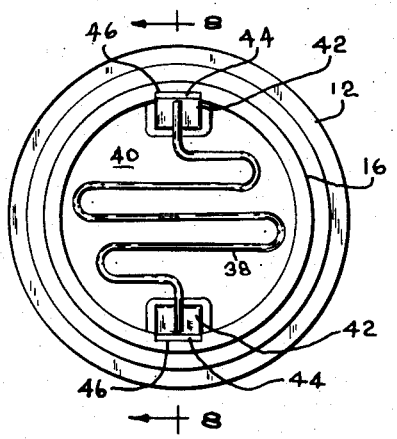
Fig. 7 is a top plan view of the lower section of the protector of Fig. 1 including the heater assembly.
Figure 8:
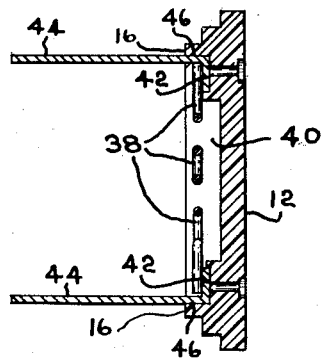
Fig. 8 is a sectional view taken on the line 8—8 of Fig. 7.

In the drawings (enlarged scale), there is illustrated a motor protector having the outer dimensions and application of a typical three-quarter inch motor protector, round base, automatic type which has become an industry standard. The motor protector herein described is interchangeable with all of the protectors that have been previously produced to this industry standard. The invention herein described may also be embodied in motor protectors of larger size and rating and in protection of both of the manual reset type and the automatic type. The invention may also be incorporated in thermostatic electric circuit-breakers of all types.

Referring particularly to the drawings, the motor protector is comprised of two parts hereinafter designated thermostatic switch assembly and heater assembly. The thermostatic switch assembly includes an insulating, inverted cup-like housing or member 10 providing the support and protection for such assembly. The heater assembly includes an insulatnig base-like part or member 12 providing the support and protection for such assembly. The member 10 at its lower open end has an internal annular recess 14 into which fits an upstanding annular flange 16 on the part 12. Such interfitting relationship accurately positions the two parts both axially and radially to unite them into the complete housing shown in Fig. 1 having the outer dimensions of the industry standard. Other methods of combining the supporting parts to form the whole will be evident to those skilled in this art cognizant of this invention. For example, the thermostatic switch assembly may be supported in a member which has the full outside shape of the industry standard and the heater assembly can be mounted on a base which fits entirely within the open end of such housing.

The thermostatic switch assembly has spaced fixed silvered contacts 18 formed by the bent-over inner ends of terminals 20 extending axially through openings 22 in the end of member 10. It is preferable that axially extending grooves 24 be provided in the inner wall of the part 10 aligned with openings 22 to permit easy assembly of the terminals and conserve space for the thermal element. The contacts 18 and associated terminals 20 are held in place by staking over a portion of the terminal against the part 10 as indicated at 26. A snap-acting thermal element 28 of well-known design having contact buttons 30 secured thereto is carried on the inner end of an adjusting screw 32 mounted in member 10. As is commonly known, such thermal element is prevented from rotation by projecting portions thereon loosely riding within the grooves 24. Reference may be had to Patents 1,448,240; 2,199,387; and 2,199,388 for details of the construction and operation of the thermostatic snap-action switch used in this assembly. It is sufficient for the purposes of understanding this invention to know that when a given amount of heat is applied to the thermal element 28 it will snap to the open position breaking the circuit between terminals 20. The inner wall of part 10 is also provided with axially extending grooves 34 aligned with openings 36 in the end of the part 10 to accommodate heater assembly terminals in the completed unit. The thermostatic switch assembly, including the fixed contacts, terminals, movable contacts, and thermal element thusly mounted on and protected by the member 10, can be easily handled and stored with the assemblies. A range of ratings of such assemblies is easily made by using differently rated thermal elements. Thus, a number of differently rated assemblies may be economically and readily stocked.

The heater assembly mounted on the member 12 includes an electrical heater wire 38 suspended within a recess 40 in the part 12 by having its ends secured to feet 42 on terminals 44. The terminals 44 are secured to the part 10 by any well known means with the shanks of such terminals in grooves 46 on the inner face of annular flange 16. One such securing means includes pins on the feet 42 passing through openings in the bottom of part 10 and riveted or spun over on the outside. By using heating wires of different resistance values a variety of ratings of heater assemblies can be made. Thus, a number of differently rated heater assemblies may be readily and economically stocked.

In order to make a motor protector of required specifications a proper thermostatic switch assembly and a proper heater assembly are selected from stock. The terminals 44 of the heater assembly are directed into the grooves 34 of the thermostatic switch assembly and the part 12 is moved into the position shown in Figs. 1 to 4, inclusive, as the terminals 44 slide out through the openings 36 of part 10. Any standard means may be used to hold the parts 10 and 12 assembled in this interfitting relationship. One such means is to stake out a part of the terminals 44 against the surface of the part 10 as indicated at 48. A dimple may also be formed in the terminals 44 which will engage the outer end of the openings 36 to hold the parts 10 and 12 together.

With the arrangement and design herein shown the heating element 38 of variously rated heater assemblies is always positioned substantially the same distance from the noncontact-carrying side of the thermal element 28. Furthermore, there is adequate space for such element and it is not necessary in some ratings to use smaller heaters operating at higher temperatures than efficient as was sometimes the case in the old style protectors. Since the heater element is positioned on the side of the thermal element away from the contacts, an unencumbered surface is exposed for efficient transfer of heat and the heater assembly may be added or removed without interfering with the thermostatic switch assembly.

I claim:

1. A thermostatic electric circuit-breaker having a first insulation base having an inwardly opening recess, fixed contact terminals carried by said first base having portions in said recess and portions extending axially thereof, a thermal element mounted on said first base within said recess having contacts engageable and disengageable with said fixed contacts upon operation of said element, a second insulation base having an inwardly opening recess, a heater element carried by said second base within said recess, terminals carried by said second base and connected with said heater, said last mentioned terminals extending axially of said second base within the lateral confines thereof, one of said bases having portions accommodating the terminals on the other of said bases, the terminals of both bases projecting in the same direction from said circuit-breaker, said bases being fitted together to bring said heater element into juxtaposition with respect to said thermal element, and means holding said bases together.

2. A breaker as claimed in claim 1 in which said holding means includes a projection on the terminals on one base engaging the other base.

References Cited in the file of this patent

UNITED STATES PATENTS

| | | |
|---|---|---|
| 1,693,379 | Gano | Nov. 27, 1928 |
| 1,772,442 | Hanny | Aug. 5, 1930 |
| 2,196,151 | Johnson | Apr. 2, 1940 |
| 2,279,214 | Veinott | Apr. 7, 1942 |
| 2,388,113 | Bolesky | Oct. 30, 1945 |
| 2,618,720 | Besag et al. | Nov. 18, 1952 |
| 2,771,528 | Moran | Nov. 20, 1956 |